July 9, 1940.   B. D. JUDOVICH   2,207,153
ELECTRIC NERVE INJECTION MODEL OF THE SPINE
Filed April 7, 1939   3 Sheets-Sheet 1

INVENTOR.
Bernard D. Judovich
BY
Harry Langsam
ATTORNEY.

Patented July 9, 1940

2,207,153

UNITED STATES PATENT OFFICE 2,207,153

ELECTRIC NERVE INJECTION MODEL OF THE SPINE

Bernard D. Judovich, Philadelphia, Pa.

Application April 7, 1939, Serial No. 266,445

3 Claims. (Cl. 35—17)

My invention relates to the human anatomy, particularly for the purpose of demonstrating relationship between the bony landmarks of the spine and the nerve roots as they leave the spine in the paravertebral region, the purpose of which is for the development and demonstration of technique in paravertebral nerve injections.

In teaching and demonstrating paravertebral nerve injections, it is extremely important for the physician to be able to localize these nerve roots as they leave the spine, both for the purpose of injection for anesthesia and for the purpose of analgesia in attempting to relieve pain involving nerve roots. A model, having as a framework a human adult skeleton and covered with material to simulate the flesh in depth, consistency, and contour, is so applied that it simulates the human body correctly from an anatomical viewpoint and is injected exactly as one would inject a human being, the bony landmarks being perfectly accurate as they are formed by a real skeleton. At each point of emergence of the nerve root from the spine there is located a proper contact sufficiently small in size to simulate the nerve root in its true anatomic position, so that upon injection with a hypodermic needle, if correctly introduced, an electrical circuit is completed on contacting the disc, and this in turn will register as a light upon a suitable visible flashboard. Each light is numbered and classified according to each particular disc and its anatomical classification. Also upon contact, besides the visible signal naming the nerve contacted, there also appears a visualization of the entire nerve distribution of that particular region which each disc represents. In addition, the model is so constructed that if the injections are made too deeply or made in the wrong direction, a warning audible signal is emitted, thus notifying the operator injecting the model that he has incorrectly inserted the needle.

An object of my invention is to instruct and demonstrate the technique of doing a paravertebral nerve injection.

Another object of my invention is to associate the location of the various nerve roots in their relationship to the bony framework of the human skeleton.

Another object of my invention is to associate in the minds of those attempting to develop this technique the relationship between the area injected and the distribution of each particular nerve segment as it is injected.

A still further object of my invention is to enable the demonstrator to find the nerve by using a hypodermic needle.

Other objects of my invention are to provide an improved device of the character described, that is easily and economically produced, which is sturdy in construction, and portable, and which is highly efficient in operation.

With the above and related objects in view, my invention consists in the following details of construction and combination of parts, as will be more fully understood from the following description, when read in conjunction with the accompanying drawings, in which.

Figure 1:
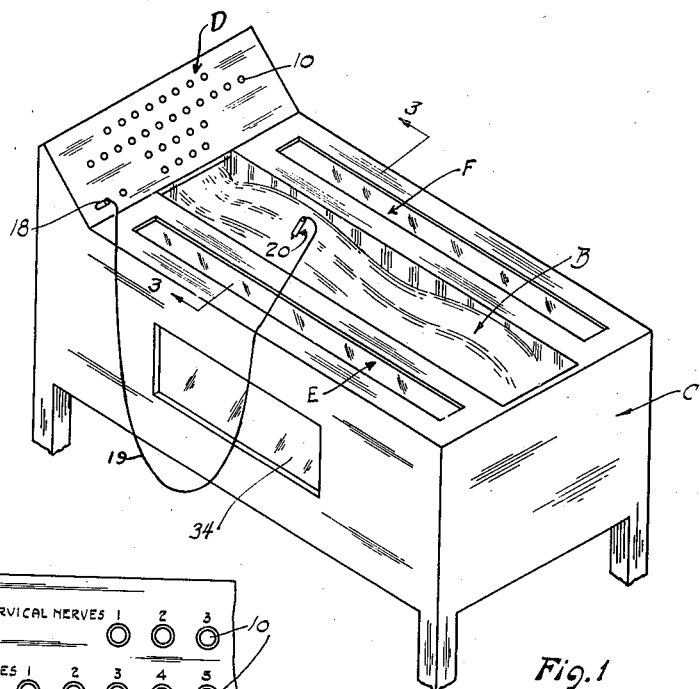
Fig. 1 is a perspective view of my invention within a cabinet.

Referring now in particular to the drawings I show in Fig. 1 a human adult skeleton, generally designated as A. The skeleton has a covering of heavy sponge rubber, approximately two inches thick, generally designated as B, on the back to closely simulate the flesh and contour, both in consistency, color, and depth, of the back of the human body. Hence, the model closely simulates the flesh and contour of the human body. The model is placed within a suitable casing, generally designated as C, which is open at the top 9 so that the back of the model is accessible. Adjacent the top of the casing is a series of nerve designations, generally designated as D, which have thereon suitable electric bulbs 10 which light when a hypodermic needle 12 passes into the proper nerve.

I do not desire to teach the injection into all possible nerves as this would be impossible, but I desire to make the injection of the spinal nerves from the first cervical down to and including the four sacral set of nerves.

Figure 2:
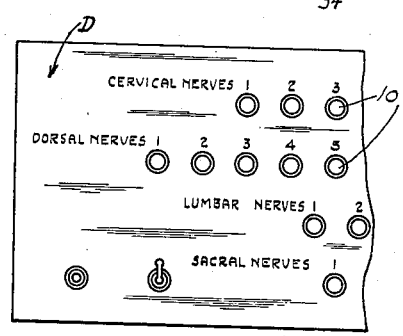
Fig. 2 is a fragmentary portion of the indicating visible light.
Figure 3:
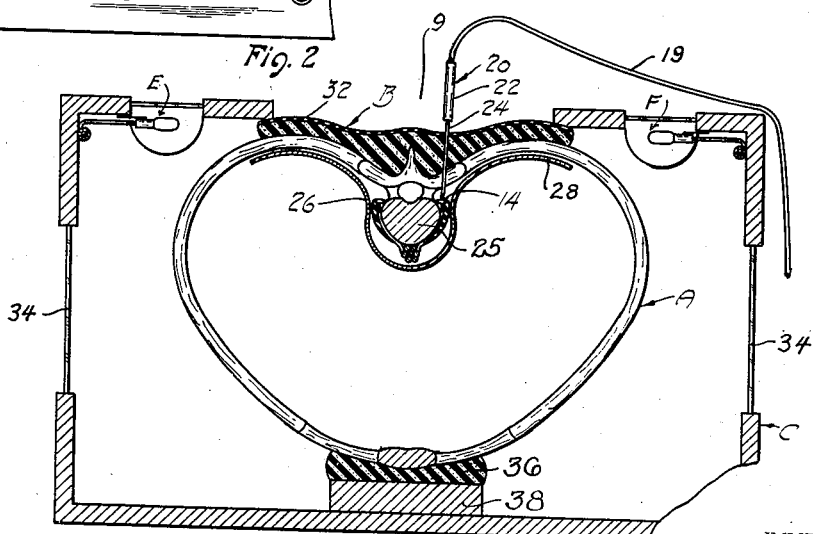
Fig. 3 is a sectional view taken on the line 3—3 of Fig. 1.
Figure 4:
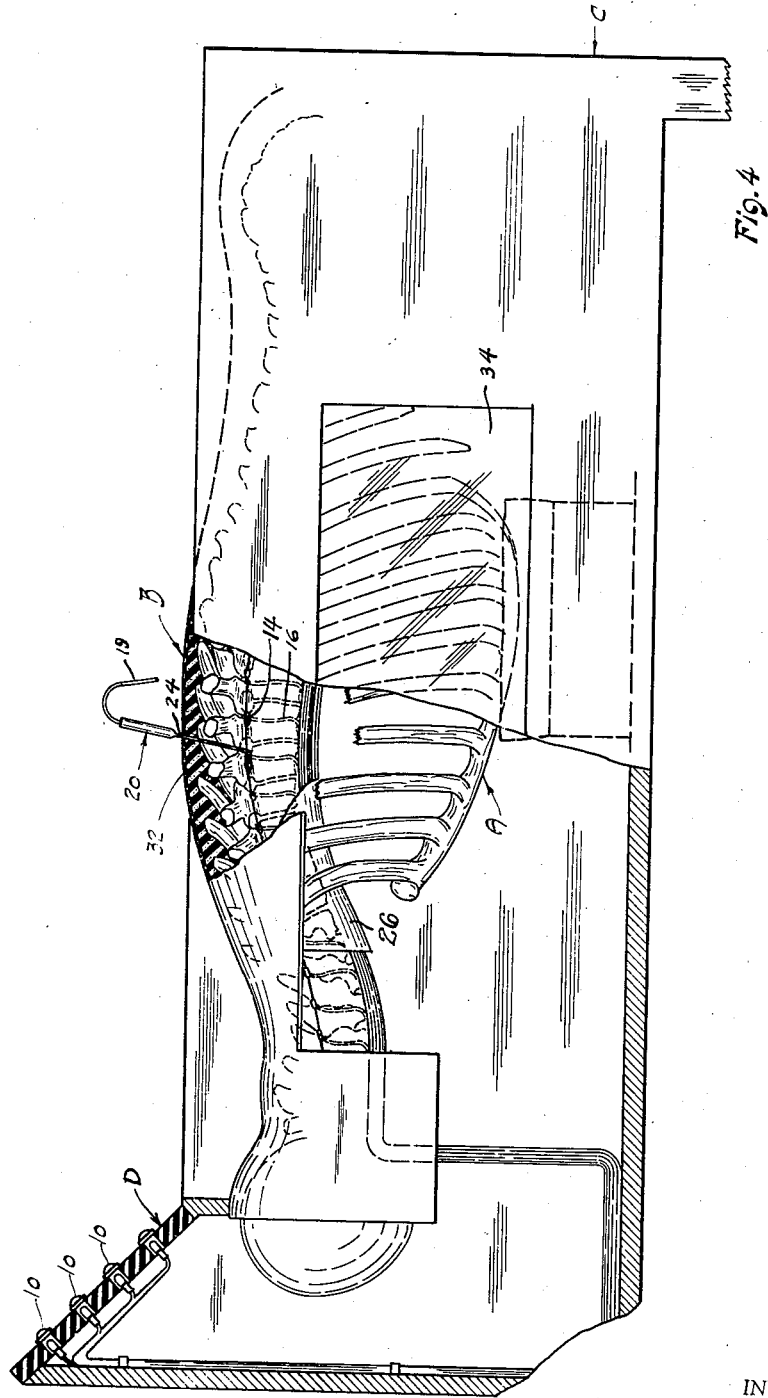
Fig. 4 is a fragmentary side elevational view through Fig. 1.
Figure 5:
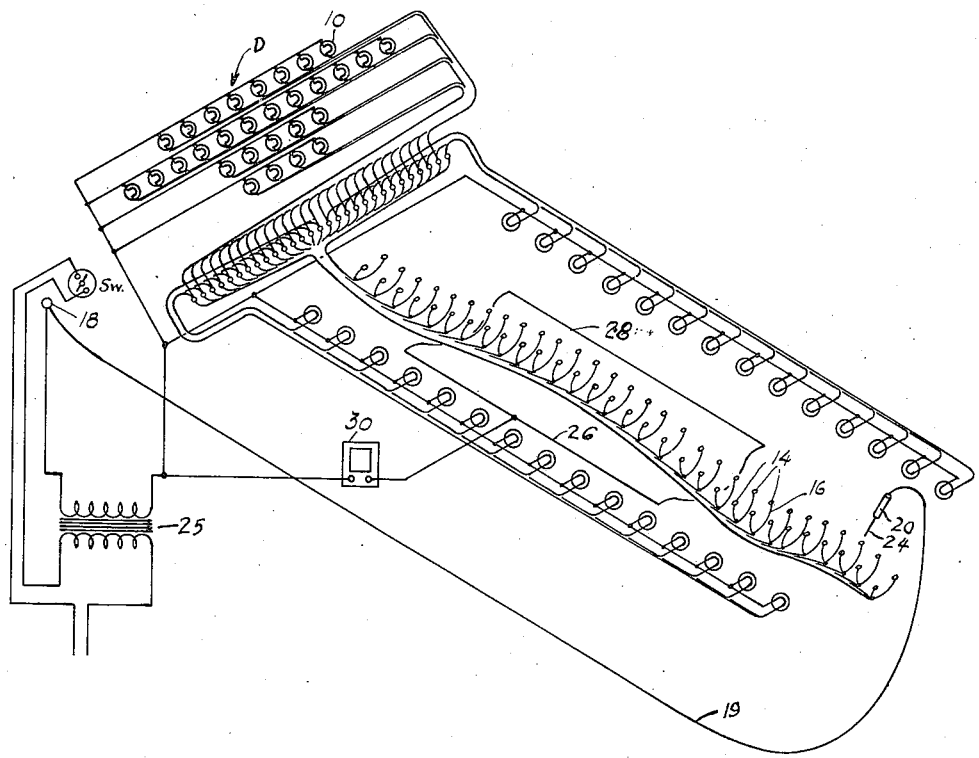
Fig. 5 is a schematic view of the electrical system.

For example, see Fig. 2, the lamps 10 have a series of nerve designations, as cervical nerves, dorsal nerves, etc., to indicate the nerve engaged.

Figure 6:
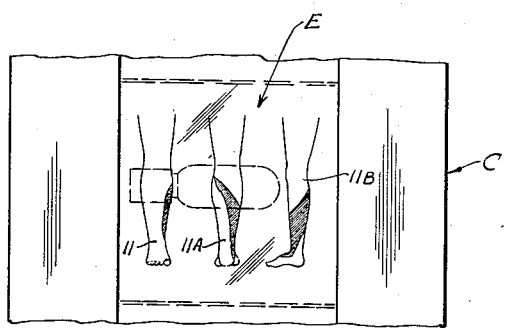
Fig. 6 is a plan view of the visual units wherein the side visual signal shows different views of the nerve which has been injected.

Thus, when one of the lamps is illuminated it will illuminate the chart depicting the appearance and location of the nerve engaged by the needle. The chart in Fig. 6 depicts the nerves in the leg of a person and not in the back and is used for illustrative purposes only.

Alongside of the model A on each side thereof in sections E and F and within the cabinet are a plurality of lamps suitably connected in parallel with the lamps on the signaling bank D. That is, each nerve has two lamps connected in parallel therewith. One lamp is on bank D and the other parallel connected lamp is in section E or F, alongside of the model.

Covering the lamps in sections E and F are a series of pictorial charts 11, 11A, and 11B depicting different views of the same nerve in the human body. The purpose of the pictorial charts is to illustrate the location of the nerve in the human body which has been illuminated both on signaling bank D and the section E or F. Repeated in other words, one set of nerves will be illuminated both on the bank D and the chart E or F when it is touched by a hypodermic needle 24.

Referring now to the human adult body portion of the skeleton A, I locate at each intervertebral foramen (from which emerge the spinal nerves) a small copper disc 14 which is one centimeter in diameter. The position of the disc 14 is at the intervertebral foramen and below the transverse process, so that it is anatomically correct in simulating the direct area of the nerve trunk as it emerges from the spine. The disc 14 is held in position by being screwed to a wood support 25 on the anterior spinal surface. To each disc 14, an insulated wire 16 is soldered.

On each side of the skeleton A, I use copper discs used in pairs at the following nerves: eight cervical, twelve dorsal, five lumbar, and four (or five) sacral.

Thus, 29 electrical connections are made on each side. A single wire is employed and used to connect both discs of a single vertebral segment.

For convenience and neatness of appearance, all of the wires are combined and formed into a single cable, and each wire is electrically connected to an individual electric light on the diagrammatic picture of the human system in section E or F and the bank D. Thus, a total of twenty-nine electric lights appear on the board D. One terminal of each of the electrical signals is connected to a common point and attached to a jack 18 in the panel, whereas the other terminal of each light is attached individually to one of the discs 14 in the skeleton that represents a particular nerve, as hereinbefore explained. That is, twenty-nine discs represent the twenty-nine nerves on each side of the back.

The nerves comprise eight cervical discs, twelve dorsal discs, five lumbar discs and four or five sacral discs on each side of the skeleton. Although thirty discs on each side are used, only twenty-nine need be used.

A suitably arranged plug-in electrical connection 18 is conveniently located on the board D and is connected to a source of electrical current and a needle holder, generally designated as 20, by means of a flexible insulated electrical conductor 19. The needle holder 20 has a Bakelite handle 22 to simulate a syringe, and the needle holder is a chuck for a hypodermic needle 24 with the hub removed. Hence, when the needle 24 touches one of the discs 14, the electrical circuit is completed, and the pictorial diagram will register exactly the segment or nerve root contacted, and a light will appear on the board D. I prefer to use a 110 volt, 60 cycle system with a voltage transformer 25 transforming the voltage to 2½ volts, where 2½ volt lamps are employed.

All areas of the metal contact are insulated except the disc itself, and all electrical portions, such as joints, wire, are encased in suitable insulating plastic material in order to prevent any electrical contact or short-circuiting except by touching the disc in its true anatomic position, which replaces the nerve trunk.

I employ two copper sheets 26, 28 joined together so they simulate the position of the lungs, kidneys and other areas that would be dangerous to inject. These sheets 26, 28 are placed inside the throat against the ribs and against the spinal column at a definite depth so that if the needle is passed too deeply or in the wrong direction when injecting, the needle will come in contact with the copper plate which in turn is connected to a 2½ volt buzzer 30, thus creating a sounding audible alarm to indicate that the technique was improper.

The skeleton is covered with sponge rubber in layers of such thickness and consistency that it correctly simulates the depth of the muscles of the back, and so the student may be able to palpate bony landmarks as he would in a human being. The under layers of rubber may be sewed on, and the final layer of rubber is cemented in position. To the outer portion of the rubber I cement a piece of muslin 32 and then cover it with liquid rubber latex. The back is then painted a flesh color.

As an illustration of the manner in which my invention is employed to demonstrate the technique of paravertebral nerve injection, I shall describe an operation.

With the electrical connections made and the electric switch closed, the demonstrator grasps the hypodermic needle 20 and probes for the nerve root. The demonstrator plunges the needle 24 through the back B at the spot and to the depth where the desired nerve is located. If the proper disc 14, indicating the proper nerve, is contacted, one lamp on the flash-board D is illuminated, and the legend under the illuminated lamp definitely designates the particular nerve root engaged by the hypodermic needle. Simultaneously with one of the lamps 10 on the flashboard being illuminated, another parallel connected lamp in section E or F is illuminated, and above this second lamp is a chart illustrating the particular nerve in the human body. Thus, both the appearance of the nerve as well as its designation appears and is visible to the demonstrator.

Assuming, however, that the demonstrator plunges the hypodermic needle in the wrong direction or too deeply, then the hypodermic needle contacts the electrical plates 26 or 28 which complete the electrical circuit to the buzzer, which indicates that improper technique has been employed.

The back B may from time to time be coated with rubber latex to remove the opening caused by the hypodermic needle. The same designations herein refer to similar elements.

The model is placed in the cabinet with glass windows 34 on the sides so that the body of the skeleton may be seen.

In the sacral region, the discs are placed upon the anterior of the spine, so that in order to contact the disc, the needle must pass into the various sacral foramina.

The skeleton A is located upon a rubber cushion 36, which is in turn mounted upon a wooden board 38, the latter resting upon the base of the casing.

Although my invention has been described in considerable detail, such description is intended as illustrative rather than limiting, since the invention may be variously embodied, and the scope of the invention is to be determined as claimed.

I claim as my invention:

1. A skeleton body having a layer of rubber on the back thereof, a metallic disc located at each intervertebral nerve foramen in the back of said skeleton, an electrical wire connected to each disc and leading to a lamp on a chart, a hypodermic needle forming one part of the electrical circuit, one lamp being lit when said hypodermic needle contacts one of said discs, and said chart illustrating the particular nerve and its particular location in the human body.

2. A skeleton body having a layer of rubber on the back thereof, a metallic disc located at each intervertebral nerve foramen in the back of said skeleton, an electrical wire connected to each disc and leading to a lamp on a chart, said chart illustrating the particular nerve and its particular location in the human body, a hypodermic needle forming one part of the electrical circuit, one lamp being lit when said hypodermic needle contacts one of said discs, a plurality of metallic sheets in said skeleton simulating the position of the lungs and kidneys, said metallic sheets connected to one side of a buzzer, and the hypodermic needle completing the electrical circuit through the buzzer when said hypodermic needle contacts the metallic sheets.

3. A skeleton body having a layer of rubber on the back thereof, a metallic disc located at each intervertebral nerve foramen in the back of said skeleton, an electrical wire connected to each disc and leading to a lamp on a chart, said chart illustrating the particular nerve and its particular location in the human body, a hypodermic needle forming one part of the electrical circuit, one lamp being lit when said hypodermic needle contacts one of said discs, and said skeleton in a casing, the interior of said skeleton being visible through the sides of said casing or cabinet.

BERNARD D. JUDOVICH.